United States Patent [19]

Innes

[11] 3,711,567
[45] Jan. 16, 1973

[54] BIS-TRIPHENYLENES AND USE IN PHOTOCHROMIC AND LUMINESCENT COMPOSITIONS

[75] Inventor: John Edwin Innes, Bridgewater Township, Somerset County, N.J.

[73] Assignee: American Cyanamid Company, Stamford, Conn.

[22] Filed: Dec. 16, 1970

[21] Appl. No.: 98,942

[52] U.S. Cl.............260/668 F, 252/300, 260/613 R
[51] Int. Cl................................C07c 15/20
[58] Field of Search ........................260/668 F

[56] References Cited

UNITED STATES PATENTS 3,548,059   12/1970   Ishida et al.................260/668 F
3,549,361   12/1970   Miller.........................260/668 F
3,557,233   1/1971    Zweig et al..................260/668 F Primary Examiner—Curtis R. Davis
Attorney—Samuel Branch Walker

[57] ABSTRACT

Triphenylene dimers of the formula:

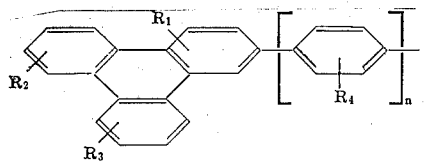

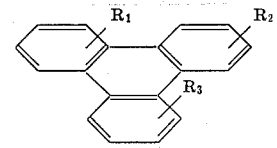

wherein $n$ is 0, 1 or 2 and each of $R_1$, $R_2$, $R_3$ and $R_4$ is one to four carbon lower alkyl, one to four carbon lower alkoxy, or hydrogen, are formed by reacting 2-bromotriphenylene or its derivatives with butyl lithium and condensation with butyl bromide or cobaltous bromide, either directly or through an intermediate series of benzene rings to give a group of compounds which have uniquely useful and strong photochromic characteristics when dissolved in an oxygen and monomer free polymeric matrix.

4 Claims, No Drawings

BIS-TRIPHENYLENES AND USE IN PHOTOCHROMIC AND LUMINESCENT COMPOSITIONS

RELATED APPLICATIONS

Canadian Pat. No. 746,257, Stamm, Brinen, Halverson and Hosterman, PHOTOCHROMIC POLYMER MATRIX, November 15, 1966, and a corresponding U.S. Pat. No. 3,635,544, Jan. 18, 1972, Stamm, Brinen, Halverson and Tennant (nee Hosterman), PHOTOCHROMIC POLYMER MATRIX, issued on Ser. No. 769,028 Oct. 21, 1968, which is a continuation-in-part of Ser. No. 332,752, Dec. 23, 1963, now abandoned; describe a photochromic filter using a polynuclear aromatic photochromic compound in a polymeric matrix free from residual monomer and oxygen.

The use of deuterated polycyclic aromatic compounds in photochromic filters is described in U.S. Ser. No. 807,920, Mar. 17, 1969, now abandoned, Stamm, a continuation-in-part of U.S. Ser. No. 408,718, Oct. 30, 1964, now abandoned. A counterpart is Canadian Pat. No. 781,707, Apr. 2, 1968.

The theory of single and double energy transfer is developed at length in N. J. Turro "Molecular Photochemistry" W. A. Benjamin Inc., New York 1967. The energy diagram on page 129 and the transfer of excitation energy between insolated chromophores, such as through a mono-, di- or tri- methylene bridge between 1-naphthalene and 9-anthracene, and the comparison of the spectra with 1-methylnaphthalene and 9-methylanthracene gives a good theoretical approach to energy transfer phenomena. A similar system is described for 1-methylnaphthalene and 4-methylbenzophenone, (pages 127 and 128).

This text discusses activation particularly from its significance in organic photoreactions. A table of triplet energies is given at page 132, which table is herein incorporated by reference.

The energy relationship of absorption is $$E_2 - E_1 = h\nu$$

where $E_2$ and $E_1$ are the energies of a single molecule in the final and initial states, $h$ is Planck's constant ($6.6254 \pm 0.0002 \times 10^{-27}$ erg. sec.). and $\nu$(nu) is the frequency (sec.$^{-1}$), at which the absorption occurs.

The absorption is often expressed in wavelength $\lambda = c/\nu$ where $\lambda$(lambda) is the wavelength, often in angstroms (A) and c is the velocity of light.

The absorption band is often expressed in wavenumbers $\bar{\nu} = 1/\lambda$, usually in reciprocal centimeters. This is the number of wavelengths per centimeter.

Frequently the physicist uses wavenumbers, but a spectroscopist often prefers wavelengths. As shown above, such units are reciprocal and readily converted. As illustrative:

CONVERSION TABLE

| $\lambda$ | $\bar{\nu}$ | $(E_2-E_1)$ | |
|---|---|---|---|
| A | Cm$^{-1}$ | K cal/mole | eV |
| 2,000 | 50,000 | 143.0 | 6.20 |
| 4,000 | 25,000 | 71.5 | 3.10 |
| 7,000 | 14,286 | 40.8 | 1.77 |
| 20,000 | 5,000 | 14.3 | 0.62 |

From original derivation the word photochromic refers to a color change from light, sometimes called phototropic. Originally light referred to electromagnetic radiation visible to the human eye, about 4,000 to 7,000 A, or 400 to 700 nanometers (nm.) or 0.4 to 0.7 microns, or 25,000 to 14,286 cm$^{-1}$; but historically the term light is frequently used to include adjacent regions of the electromagnetic spectrum.

For efficient use as a photochromic filter, the photochromic material in its matrix needs to have a high absorption coefficient for activating radiation to raise ground state molecules to an excited single, then an efficient rate of intersystem crossing from the singlet to the triplet state and finally a triplet state with a high extinction coefficient and preferably a long life. Whereas many organic molecules are excellent insofar as one or more of these criteria are concerned, it is unusual to find molecules which meet requirements in all three of these criteria.

The present bistriphenylenes, which include lower alkyl and lower alkoxy substituted 2,2'-bitriphenylenes and compounds in which the triphenylene structures are separated by one or two benzene rings with the orientation being such that two of the phenylene rings in each of the triphenylene structures and all of the intervening benzene rings can be written to form a straight line and in fact can form a single linear polyparaphenylene structure having at least 4 phenylene rings in line. The compounds of the above formula can be prepared by conventional methods.

To obtain compounds where $n$ is 0, 2-bromotriphenylene, or derivative thereof, is reacted with n-butyllithium to form 2-triphenylenyllithium, and two moles of the latter compound are condensed by reaction with n-butyl bromide and cobaltous bromide. To obtain compounds where $n$ is 1 or 2, 2-triphenylenyllithium is reacted with a 1,4-cyclohexanedione or a [bicyclohexyl]-4,4'dione, respectively, and the resulting intermediate is hydrolyzed with dilute sulfuric acid and aromatized by palladium-on-carbon in p-cymeme. The 2-bromotriphenylenes which may be used include 2-bromotriphenylene, obtained by bromination of triphenylene (J. Chem. Soc. 1955, 4482), and alkyl and alkoxy derivatives thereof, such as 2-bromo-3-methyltriphenylene, 2-bromo-3-ethyltriphenylene, 2-bromo-3,10-dimethyltriphenylene, 2-bromo-3-methoxytriphenyl, etc. The bromo-alkyl compounds can be obtained by the bromination of the parent compound. The bromo-alkoxy compounds can be obtained by bromination of the corresponding hydroxytriphenylene followed by alkylation of the hydroxyl group.

The cyclohexanediones which may be used include 1,4-cyclohexanedione, alkyl 1,4-cyclohexanediones, such as methyl-1,4-cyclohexanedione, propyl-1,4-cyclohexanedione, 2,5-dimethyl-1,4-cyclohexanedione, 2,6-dimethyl-1,4-cyclohexanedione, etc., [bicyclohexyl]4,4'-dione, and alkyl [bicyclohexyl]-4,4'-dione, etc.

In a procedure for preparing alkyl substituted compounds, the parent compound is alkylated by reaction with an alkyl halide in the presence of aluminum chloride in accordance with well-known Friedel-Crafts procedures.

The compounds are stable high melting solids at least slightly soluble in many organic solvents.

The compounds of this invention may be incorporated in non-opaque substrates capable of transmitting light in the range of 200 to 2,000 nanometers. The nature of the substrate may vary considerably over a broad class of compositions ranging from fluids to solids. The solids may be either crystalline or amorphous, among the most suitable being glasses and polymeric materials.

The glasses include low temperature glasses derived from organic solvents, such as 2-methyltetrahydrofuran, methylcyclohexane, and ether-pentane-alcohol; inorganic glasses such as phosphate glasses and borate glasses are also suitable. When liquid substrates are used, the lifetime of the triplet level is usually short, so that the photochromic effect can be detected only instrumentally.

The polymeric materials which may be used in this invention include a wide range of polymeric materials which exist today. For many purposes, the polymeric material should have optical transparency. A lack of color is also desirable. The polymeric materials include thermoplastics such as polyacrylates, polymethacrylates, cellulose acetate, cellulose propionate, cellulose acetate-butyrate, cellulose nitrate, ethyl cellulose, polycarbonates, polyacrylonitrile, polyamides, polystyrene, poly(methylstyrenes), poly(chloromethylstyrenes), poly(styrene-butadiene), poly(vinyl acetate), poly(vinyl acetals), poly(vinyl chloride), poly(vinyl butyral), poly(vinyl formal), chlorinated polyethers and silicones; and thermosetting resins such as phenolformaldehyde condensates, melamine-formaldehyde condensates, polyester-styrene combinations, polyurethanes, epoxies, and copolymers and mixtures thereof.

The photochromic material is uniformly dispersed throughout the plastic matrix. This can be done by adding the compound to the monomer or monomers followed by polymerization; by dissolving the polymer and photochromic compound in a solvent and casting a rigid sheet, film or other form; by milling the photochromic combination of compounds with the polymeric material, etc. The photochromic compound can also be applied to the formed plastic article.

The photochromic effect is a function of the concentration of the photochromic compound, the thickness of the substrate and the intensity of the exciting radiation. Given adequate light intensity, the effect increases with increasing concentration and also increases with increasing thickness. For a given concentration and thickness, the effect increases with increasing light intensity up to the saturation value.

The amount of the photochromic compound to be used in the compositions of the invention may range from 0.0001 to 2.0 percent based on the amount of non-opaque substrate. In normal practice, at least 0.0001 percent, preferably at least 0.05% of the photochromic compound is employed.

The compositions of this invention have many uses, such as in sunglasses, welding goggles, skylights, automobile windows and windshields, windows for buildings and dwellings, windows for space vehicles and aircraft, paints and surface coatings for novelty effects, energy measuring devices, etc.

For best results, the polymeric matrix should be free from monomers and from molecular oxygen. The activated form of the bistriphenylenes is a triplet-triplet configuration, and triplet molecules are very reactive. Therefore if the monomer or molecular oxygen is present, the triplet configuration may be inactivated before it has an opportunity to achieve the desired photochromic effect. It is to be understood that the degree of photochromic action, the intensity of the incident activating radiation and temperature all have an important effect on the final results obtained. The applications and patents of Stamm et al. above referred to explain in detail practical and theoretical aspects of photochromic activity.

The application of the present invention is illustrated in the following examples in which parts are by weight except where clearly otherwise specified:

EXAMPLE 1

2,2'-Bitriphenylene

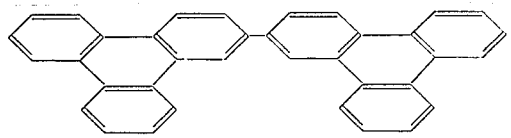

To a solution of 1.54 g. 2-bromotriphenylene (J. Chem. Soc. 1955, 4482) in 40 ml. ether is added 3.5 ml. of a 15 percent solution n-butyllithium in n-hexane, followed by 0.75 g. n-butyl bromide and 0.2 g. anhydrous cobalt bromide. After a reaction period of several hours, dilute hydrochloric acid is added and the ether is allowed to evaporate. The residue is filtered and the filter cake is washed with water. The product is 2,2'-bitriphenylene. After recrystallization from chlorobenzene and chromatography on alumina with benzene, the white crystals melt at 347°–349°C.

Calculated for $C_{36}H_{22}$: C, 95.12; H, 4.88
Analysis: C, 95.16; H, 4.59.

EXAMPLE 2

3,3'-Dimethoxy-2,2'-bitriphenylene

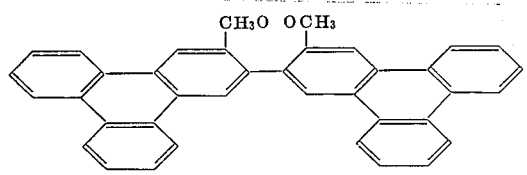

A mixture of 0.67 g. 2-bromo-3-methoxytriphenylene (prepared by bromination of 2-hydroxytriphenylene followed by methylation), 1.5 ml. 15 percent solution of n-butyllithium in n-hexane, 0.35 g. n-butyl bromide, 0.10 g. anhydrous cobalt bromide and 20 ml. of ether is stirred for several hours. Dilute hydrochloric acid is added and the ether is allowed to evaporate. The solids are chromatographed on alumina with benzene and then recrystallized from chlorobenzene. The product, 3,3'-dimethoxy-2,2'-bitriphenylene, is obtained as colorless crystals melting at 347°C.

Calculated for $C_{38}H_{26}O_2$: C, 88.7; H, 5.09
Found: C, 88.9; H, 4.79

EXAMPLE 3

3,3'-dimethyl-2,2'-bitriphenylene

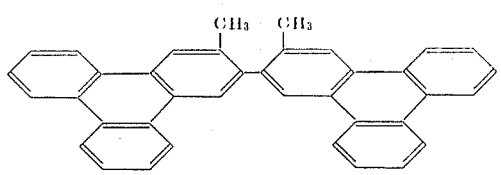

When the procedure of Example 2 is repeated with substitution of 2-bromo-3-methyltriphenylene (bromination product of 2-methyltriphenylene) for the 2-bromo-3-methoxytriphenylene, the product is 3,3'-dimethyl-2,2'-bitriphenylene.

EXAMPLE 4

Polyethylated 2,2'-bitriphenylene

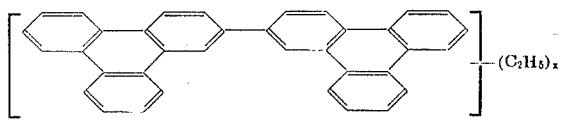

Anhydrous aluminum chloride (1.0 g.) is added slowly to 0.45 g. 2,2'-bitriphenylene in 40 ml. ethyl bromide, and the mixture is stirred for about 20 hrs. Dilute hydrochloric acid is added and after several hours, the organic layer is filtered and evaporated. Chromatography of the residue on alumina with 80/20 methylcyclohexane/benzene yields ethylated 2,2'-bitriphenylene. $x$ is from about 6 to 12.

EXAMPLE 5

2,2'-(p-Phenylene)bis(triphenylene)

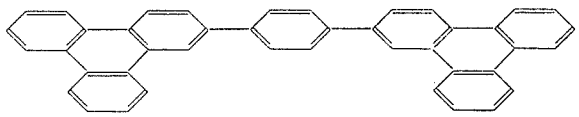

To a solution of 1.54 g. 2-bromotriphenylene in 100 ml. ether is added 3.2 ml. 15 percent solution of n-butyllithium in n-hexane followed by a solution of 0.28 g. 1,4-cyclohexanedione in 50 ml. ether. After a reaction period of about 4 hrs., dilute sulfuric acid is added and the ether is allowed to evaporate. The residue is filtered and the filter cake is washed with water and dried. The filter cake, 0.3 g. 10 percent palladium-on-carbon, and 20 ml. p-cymene are heated at the reflux for 1 hour. The product is 2,2'-(p-phenylene)-bis(triphenylene). After recrystallization from chlorobenzene and o-dichlorobenzene, yellow crystals melting at 419°C. are obtained.

EXAMPLE 6

When the procedure of Example 5 is repeated using an equivalent amount of 2-methyl-1,4-cyclohexanedione or [bicyclohexyl]-4,4'-dione for the 1,4-cyclohexanedione, the products are 2,2'-(p-tolylene)bis(triphenylene) and 2,2'-(p,p'-biphenylene)bis(triphenylene), respectively.

EXAMPLE 7

Polyethylated 2,2'-(p-Phenylene)bis(triphenylene)

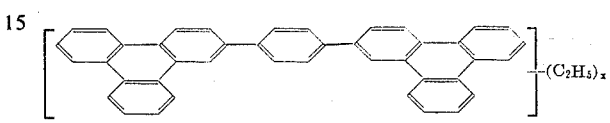

Ethylation of 2,2'-(p-phenylene)bis(triphenylene) (product of Example 5), by the procedure of Example 4 yields ethylated 2,2'-(p-phenylene)bis(triphenylene).

EXAMPLE 8

The products of the preceeding examples are dissolved in tetrahydrofuran and the solutions are frozen in liquid nitrogen (77°K). The frozen solutions are irradiated with ultraviolet light and the color of the resulting phosphorescence is noted. The wavelengths of peak emission are also measured instrumentally. The results are shown in Table I.

Table I

Phosphorescence

| Product | Color | Peak Emission | Mean Lifetime |
|---|---|---|---|
| Example 1 | green | 19892 cm$^{-1}$ | 5.2 sec. |
| Example 2 | blue-green | 22200 | 5.2 |
| Example 4 | green | 19323 | > 2 |
| Example 7 | green | 20000 | > 2 |

EXAMPLE 9

The photochromic properties of frozen solutions (77°K) in tetrahydrofuran are instrumentally measured using an electron spin resonance spectrometer. The wavelengths of maximum absorption and the intensities are shown in Table II. The visual photochromic color changes of the frozen solutions when irradiated with a mercury SH arc lamp are also noted.

Table II

Photochromism

| Product | Color Change | Absorption Maxima | Intensity, $\epsilon$ |
|---|---|---|---|
| Ex. 1 | Colorless → purple | 523 nm | 60,000 |
|  |  | 572 | 150,000 |
| Ex. 2 | Colorless → blue | 500–650 (broad) | 18,000+ |
| Ex. 4 | Pale Yellow → | 558 | 32,000 |
|  | Blue-green | 603 | 71,000 |
|  |  | 640 | 86,000 |
| Ex. 7 | Pale Yellow | 585 | 74,000 |
|  | → gray | 612 | 220,000 |
|  |  | 652 | 210,000 |

+ At peak

As shown in Example 9, the compounds in which the biphenyl structures are separated by one or more phenyl groups and those which are substituted by an alkyl or alkoxy group have an absorption maximum at slightly longer wavelengths that is more toward the red and less towards the blue. For many purposes, the longer absorption bands are desired. Also as shown in Example 9 the extinction coefficient, $\epsilon$, is large. The extinction coefficient is frequently expressed in liters per mole centimeter and values of at least 30,000 are preferred for commercially competitive products.

EXAMPLE 10

To a solution of 0.1 g. polyethylated 2,2'-bitriphenylene (product of Example 4) in a mixture of about 46.5 g. inhibitor-free methyl methacrylate monomer and about 2.5 g. ethylene dimethacrylate, is added 0.01 percent azobis-(isobutyronitrile), based on the weight of the monomer. After degassing to a pressure equivalent to less than $10^{-5}$ mm of mercury, polymerization is allowed to take place in a cylindrical mold, first at 50°C. for 12 hrs. and then at 80°C. for 72 hrs. The rough cylinder of poly(methyl methacrylate) is machined to a right cylinder 4 cm long × 2 cm diameter. The ends of the cylinder are polished to provide an optical finish.

When exposed to sunlight or the radiation of an RS-type sunlamp, the polymer changes from essentially colorless to blue-green. When exposed to ultraviolet radiation, the polymer exhibits a green phosphorescence.

Similar results are obtained when 2,2'-bitriphenylene is used in place of the polyethylated 2,2'-bitriphenylene.

EXAMPLE 11

A mixture of 0,05 g. 3,3'-dimethoxy-2,2'-bitriphenylene, a product of Example 2, and 2.16 g. of a commercial epoxy resin, the diglycidyl ether of bisphenol - A (Shell Epon 828), is dissolved in about 45 g. benzene. The benzene is evaporated, the last traces being removed in vacuo, and the residual solution is mixed with 2.0 g. phthalic anhydride.

The resin mixture is cast between two lantern slide cover glasses with 0.5 mm cellulose acetate spacers and cured in an oven at 120°C. for 2 days. When the polymer sheet is exposed to a mercury SH arc lamp, the polymer changes from essentially colorless to blue. When exposed to ultraviolet radiation, the polymer exhibits a blue-green phosphorescence.

Triphenylenes are well known compounds.

What may be a bitriphenylene is disclosed by N. P. Buu-Hoi and Denise Lavit-Lamy, Bull. Soc. Chim. France, *1966*, 2500 which shows a Friedel-Crafts reaction on triphenylene with speculation as to the products obtained. The product may have contained a certain amount of 2,2'-bitriphenylene, and the formula is given as a speculative product, but as a random mixture of product could not have been expected to show the advantageous characteristics of the present consistently oriented compounds.

W. Ried and K. H. Bonnighausen Chem. Ber. *93* 1769 (1960) on page 1771 disclose 2,2'-(p-phenylene)-bis(1,4-diphenyltriphenylene).

I claim:

1. A triphenylene of the formula:

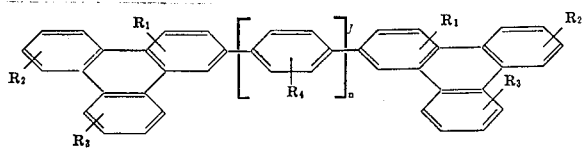

wherein $n$ is 1 or 2 and each of $R_1$, $R_2$, $R_3$ and $R_4$ is one to four carbon lower alkyl or hydrogen.

2. The compound under claim 1 which is 2,2'-(p-phenylene)bis(triphenylene).

3. The compound under claim 1 which is 2,2'-(p-tolylene)bis(triphenylene).

4. The compound under claim 1 which is 2,2'-(p,p'-biphenylene)bis(triphenylene).

* * * * *